United States Patent
van Besouw et al.

(10) Patent No.: US 11,942,777 B2
(45) Date of Patent: Mar. 26, 2024

(54) DISCONNECTOR DEVICE AND OVERVOLTAGE PROTECTION ASSEMBLY INCLUDING THE SAME

(71) Applicant: Hubbell Incorporated, Shelton, CT (US)

(72) Inventors: Bastiaan Hubertus van Besouw, Strongsville, OH (US); Peter James Swales, Aiken, SC (US); Sidharth Suresh Iyer, Wadsworth, OH (US); Mohamed Fayaz Suleiman Khatri, Macedonia, OH (US); Stephen Franklin Poterala, Aiken, SC (US); Robert Christopher Schmitt, Lexington, SC (US); Xingniu Huo, Medina, OH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/871,729

(22) Filed: Jul. 22, 2022

(65) Prior Publication Data

US 2022/0368123 A1    Nov. 17, 2022

Related U.S. Application Data

(63) Continuation of application No. 16/862,052, filed on Apr. 29, 2020, now Pat. No. 11,411,386.

(Continued)

(51) Int. Cl.
*H02H 3/20* (2006.01)
*H02H 3/02* (2006.01)
(Continued)

(52) U.S. Cl.
CPC ............... *H02H 3/20* (2013.01); *H02H 3/02* (2013.01); *H02H 3/021* (2013.01); *H01T 1/16* (2013.01); *H02G 13/80* (2013.01); *H02H 3/22* (2013.01)

(58) Field of Classification Search
CPC ............ H02H 3/20; H02H 3/02; H02H 3/021; H02H 3/22; H02G 13/00; H02G 13/80; (Continued)

(56) References Cited

U.S. PATENT DOCUMENTS

| 5,289,154 A | 2/1994 | Davis |
| 5,359,174 A | 10/1994 | Smitih et al. |

(Continued)

FOREIGN PATENT DOCUMENTS

| DE | 19637984 | 3/1998 |
| DE | 102012016847 | 2/2014 |
| WO | 2017148544 | 9/2017 |

OTHER PUBLICATIONS

PCT/US2020/030475 International Search report and Written Opinion dated Jul. 20, 2020 (14 pages).

*Primary Examiner* — Danny Nguyen
(74) *Attorney, Agent, or Firm* — Michael Best & Friedrich LLP

(57) ABSTRACT

A disconnector device including an isolator connected between a first terminal and to a second terminal, and a sleeve positioned around the isolator and moveable between an un-extended position prior to the isolator operating and an extended position after the isolator operates, the sleeve being configured to trap debris produced by operation of the isolator.

21 Claims, 14 Drawing Sheets

Related U.S. Application Data

(60) Provisional application No. 62/990,006, filed on Mar. 16, 2020, provisional application No. 62/933,649, filed on Nov. 11, 2019, provisional application No. 62/840,086, filed on Apr. 29, 2019.

(51) Int. Cl.
*H01T 1/16* (2006.01)
*H02G 13/00* (2006.01)
*H02H 3/22* (2006.01)

(58) Field of Classification Search
CPC .. H02G 13/60; H01T 1/16; H01T 1/14; H01T 9/14; H01H 37/76; H01H 39/002; H01H 85/44; H01C 7/126; H01C 7/12
USPC .................................................. 361/117–120
See application file for complete search history.

(56) References Cited

U.S. PATENT DOCUMENTS

| | | |
|---|---|---|
| 5,400,207 A | 3/1995 | Krause |
| 5,650,772 A | 7/1997 | Schmidt |
| 6,956,458 B2 | 10/2005 | Lenk et al. |
| 7,675,728 B2 | 3/2010 | Woodworth et al. |
| 10,109,399 B2 | 10/2018 | Boese et al. |
| 10,454,251 B2 | 10/2019 | Mugwyler et al. |
| 2008/0068122 A1 | 3/2008 | Enk et al. |
| 2011/0216463 A1 | 9/2011 | Kester et al. |
| 2018/0075953 A1 | 3/2018 | Boese et al. |
| 2018/0076617 A1 | 3/2018 | Boese et al. |
| 2019/0280463 A1 | 9/2019 | Lindemulder |
| 2022/0336125 A1* | 10/2022 | Poterala ................. H01C 7/126 |

\* cited by examiner

DISCONNECTOR DEVICE AND OVERVOLTAGE PROTECTION ASSEMBLY INCLUDING THE SAME

CROSS-REFERENCE TO RELATED APPLICATIONS

This application claims priority to U.S. Non-Provisional patent application Ser. No. 16/862,052 filed on Apr. 29, 2020, which claims priority to U.S. Provisional Patent Application No. 62/840,086 filed on Apr. 29, 2019, U.S. Provisional Patent Application No. 62/933,649 filed on Nov. 11, 2019, and U.S. Provisional Patent Application No. 62/990,006 filed on Mar. 16, 2020, the entire contents of which, in each of these applications, is incorporated herein by reference.

BACKGROUND

The present application relates to overvoltage protection assemblies, and more specifically, to disconnector devices within overvoltage protection assemblies. Disconnector devices (e.g., isolators) are typically used as a protection measure for surge arresters. The present disclosure also relates to a sleeve for containing particles created through use of the disconnector device.

SUMMARY

Electrical grids commonly incorporate protective devices, such as surge arresters, to protect associated equipment from power surges such as those due to lightning, electrical switching events, etc. These protective devices may incorporate fail-safes such as disconnector devices that isolate the protective device from the electrical grid during certain events, such as a surge arrester failing and creating an undesirable low impedance fault.

The current disclosure provides for a disconnector device that is compatible with existing protection assemblies, such as surge arresters. The disconnector device may be placed between an electric grid line, and the surge arrester, or between the surge arrester and ground to create an electric connection. When an associated disconnect condition is met, such as, but not limited to, a failure of a surge arrester or the existence of a predetermined amount of leakage current, the disconnector device performs an action, either by itself on in concert with other devices, to break that electrical connection.

In one embodiment, a self-contained explosive isolator includes an explosive charge and a sleeve. The explosive charge is coupled to a first electrical lead and to a second electrical lead. The sleeve is positioned around the explosive charge and is moveable between an un-extended position prior to the explosive charge being detonated and an extended position after the explosive charge has been detonated. Debris produced by detonating the explosive charge is trapped in the sleeve.

In another embodiment, a self-contained explosive isolator includes an explosive charge and a sleeve. The explosive charge is coupled between a first plate and a second plate. The sleeve is positioned around the explosive charge and is coupled to the first plate and to the second plate. The sleeve is configured to withstand detonation of the explosive charge. Debris produced by detonating the explosive charge is trapped in the sleeve.

In a further embodiment, the disclosure provides a surge protection system consisting of both a surge arrester and disconnect device. An electrical grid line is electrically connected to the assembly. A disconnector device having a first disconnector terminal and a second disconnector terminal has the first disconnector terminal coupled to the electrical grid line. A surge arrester having a first arrester terminal and a second arrester terminal has the first arrester terminal coupled to the second disconnector terminal and the second arrester terminal coupled to a ground potential.

In another embodiment, a disconnector device for an overvoltage protection assembly has a first terminal coupled to a power source, and a second terminal coupled to a surge arrester. The disconnector device is configured to provide an electrical connection between the power source and the surge arrester. The disconnector device performs an operating function to interrupt the electrical connection based on receiving an overvoltage condition.

In another embodiment, a stand-alone disconnector device may be installed with a pre-existing surge arrester. Such a device has a first terminal coupled to an energized line, and a second terminal coupled to the line side of a surge arrester. The disconnector device is configured to provide an electrical connection between the power source and the surge arrester. The disconnector device performs an operating function to interrupt the electrical connection based on detection of a signal that may be based on current, voltage, temperature, or some other factor reflecting health of the associated surge arrester.

In another embodiment, a stand-alone disconnector device may be installed remotely on the ground side of a pre-existing surge arrester. Such a device has a first terminal connected to the ground side of a surge arrester via some distance of electrical line or cable, and a second terminal connected to ground. The disconnector device is configured to provide an electrical connection between the arrester and ground. The disconnector device performs an operating function to interrupt the electrical connection based on detection of a signal that may be based on current, voltage, temperature, or some other factor reflecting health of the associated surge arrester.

In yet another embodiment, a stand-alone disconnector device may be installed in series with a protected device other than a surge arrester, to perform a similar operating function. Such a disconnector device may be connected either between the power supply and the protected device, or between the protected device and ground, to complete the associated electrical circuit. The disconnector device performs an operating function to interrupt the electrical connection based on detection of a signal that may be based on current, voltage, temperature, or some other factor reflecting health of the associated protected device.

In yet another embodiment, a disconnector device includes an isolator connected between a first terminal and to a second terminal, and a sleeve positioned around the isolator and moveable between an un-extended position prior to the isolator operating and an extended position after the isolator operates, the sleeve being configured to trap debris produced by operation of the isolator.

In yet another embodiment, a disconnector assembly includes a disconnector device in electrical communication with a first conductor and a second conductor. The disconnector device includes an isolator connected between a first terminal and to a second terminal. The first terminal is in electrical communication with the first conductor and the second terminal is in electrical communication with the second conductor. The first and second terminals are spaced apart by a first distance prior to the isolator operating and the first and second terminals are spaced apart by a second distance after the isolator operates. The second distance is greater than the first distance. A sleeve is positioned around the isolator and moveable between an un-extended position prior to the isolator operating and an extended position after the isolator operates. The sleeve is configured to trap debris produced by operating the isolator. The isolator is configured to provide an electrical connection the first and second conductors, and the isolator performs an operating function to interrupt the electrical connection.

In yet another embodiment, a method of interrupting an electrical connection with a disconnector device is provided and includes, in response to meeting a pre-determined threshold of temperature, overvoltage, or leakage current, operating the isolator coupled between a first terminal and a second terminal, and moving a sleeve positioned around the isolator and between the first terminal and the second terminal from an un-extended position to an extended position.

In yet another embodiment, a disconnector device includes an isolator having a first terminal and a second terminal, wherein the first terminal is electrically connected to an energized conductor and the second terminal is electrically connected to a high voltage terminal of a surge arrester.

In yet another embodiment, an electrical system includes an electrical conductor for carrying an electrical current; a surge device configured to conduct at least some of the electrical current based on the occurrence of a first predetermined condition; an isolator configured to conduct at least some of the electrical current, wherein the isolator includes a destructive component that destructs when a second predetermined condition is satisfied. The isolator includes a first electrical connector coupled to the electrical conductor and a second electrical connector coupled to the surge device. The isolator includes a flexible cover for retaining at least some of the destructive component of the isolator when the destructive component destructs.

Other aspects of the disclosure will become apparent by consideration of the detailed description and accompanying drawings.

DETAILED DESCRIPTION

Figure 1:
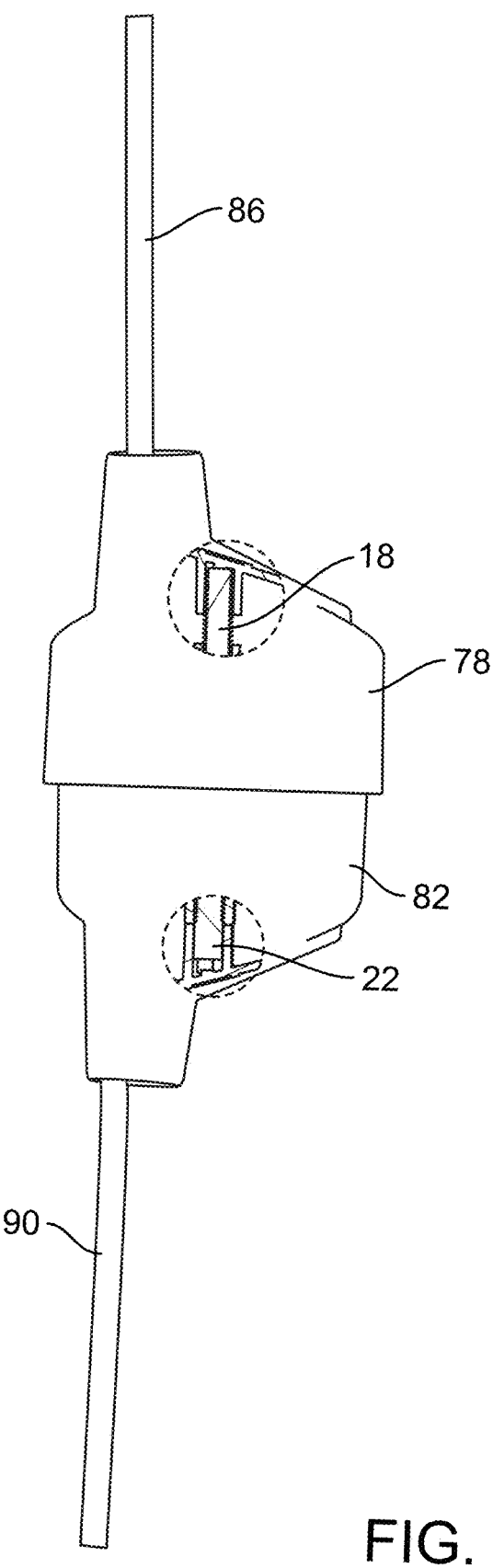
FIG. 1 is a side view of a portion of a disconnector assembly according to one embodiment.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to an overvoltage protection assembly including a disconnector device and to a sleeve for use in a disconnector device. In some embodiments, the sleeve retains sparks, and other flammable materials, to prevent them from falling to the ground after the disconnector device is discharged.

As shown in FIGS. 1-6, a disconnector device 10 (FIG. 2) includes a charge housing or isolator 14 containing a charge (e.g., an explosive charge) coupled to a first electrical lead or upper stud 18 and a second electrical lead or lower stud 22. In other embodiments, the upper stud 18 and the lower stud 22 may be integrally formed with the isolator 14. In the illustrated embodiment, the upper and lower studs 18, 22 are made from an electrically conductive material (e.g., metal) and may provide electrical communication to the charge.

As shown in FIGS. 2-6, a first plate 26 (e.g., first connector or upper sleeve connector) is coupled to the upper stud 18, and a second plate 30 (e.g., second connector or lower sleeve connector) is coupled to the lower stud 22. An opening 34, 46 in each upper and lower sleeve connector 26, 30 is aligned with the respective stud 18, 22, enabling the upper and lower sleeve connectors 26, 30 to be positioned around the studs 18, 22. In the illustrated embodiment, the studs 18, 22 are threaded and nuts 38, 40 (see e.g., FIG. 2) may be used to secure the respective upper and lower sleeve connector 26, 30, and limit relative movement with respect to the respective stud 18, 22. Each of the upper and lower sleeve connectors 26, 30 may also include a groove 42, 44 (FIGS. 4 and 4A) that extends about a circumference of the respective upper and lower sleeve connectors 26, 30. In the illustrated embodiment, each of the upper and lower sleeve connectors 26, 30 include a plurality of teeth 43, 45. A portion of each of the teeth 43, 45 collectively define the respective grooves 42, 44.

As shown in FIGS. 2-4, 6, and 8, in some embodiments, a sleeve 46 (e.g., a fire resistant sleeve) is positioned around the isolator 14 and is coupled to each of the upper and lower sleeve connectors 26, 30. That is, the upper sleeve connector 26 and the lower sleeve connector 30 are also coupled (e.g., connected) via the sleeve 46. In the illustrated embodiment, a respective end of the sleeve 46 is positioned within the groove 42 of the respective upper and lower sleeve connector 26, 30. Retaining members 50, 52 (e.g., clips—FIG. 4) are positioned over top of the ends of the sleeve 46 and around the groove 42 to couple the sleeve 46 to the connector 26, 30. The sleeve 46 is flexible so that it is collapsible (e.g., contractable) and expandable (e.g., extendable). The isolator 14 may be further enclosed by an arc quenching material 53, which is contained by the upper and lower sleeve connectors 26, 30 and the sleeve 46. In some embodiments, the arc quenching material 53 of the disconnector device 110 may extinguish electrical arcs at current levels of 10 kA or less. In some embodiments, the arc quenching material 53 of the disconnector device 10 may extinguish electrical arcs at current levels of 20 kA or less. In some embodiments, the arc quenching material 53 of the disconnector device 10 may extinguish electrical arcs at current levels of 30 kA to 50 kA. The arc quenching material 53 may extinguish electrical arcs at other values as well. In other embodiments, the sleeve 46 may be omitted.

Figure 5:
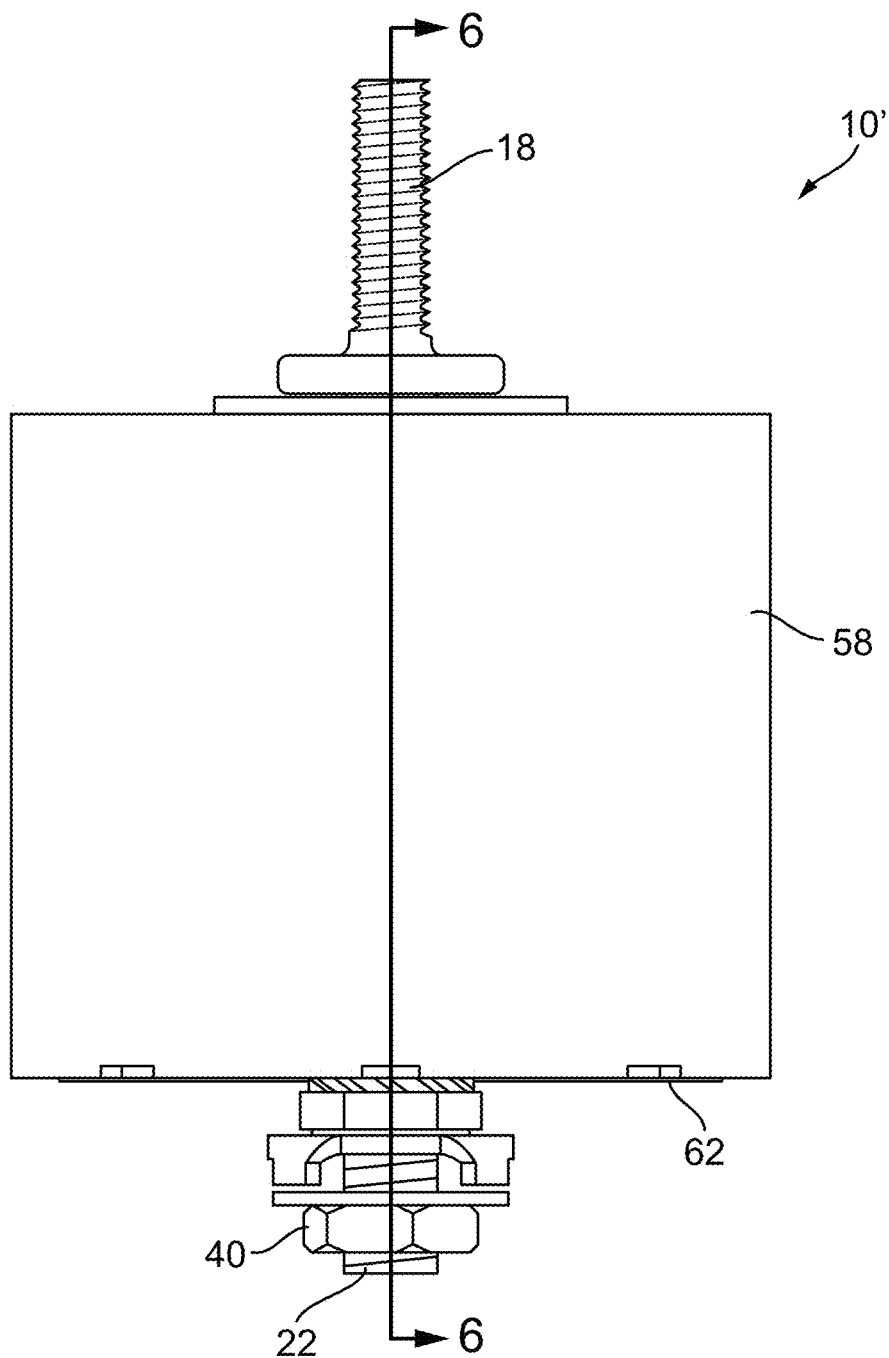
FIG. 5 is a side view of the disconnector device and housing of FIG. 2 in an un-extended position.
Figure 6:
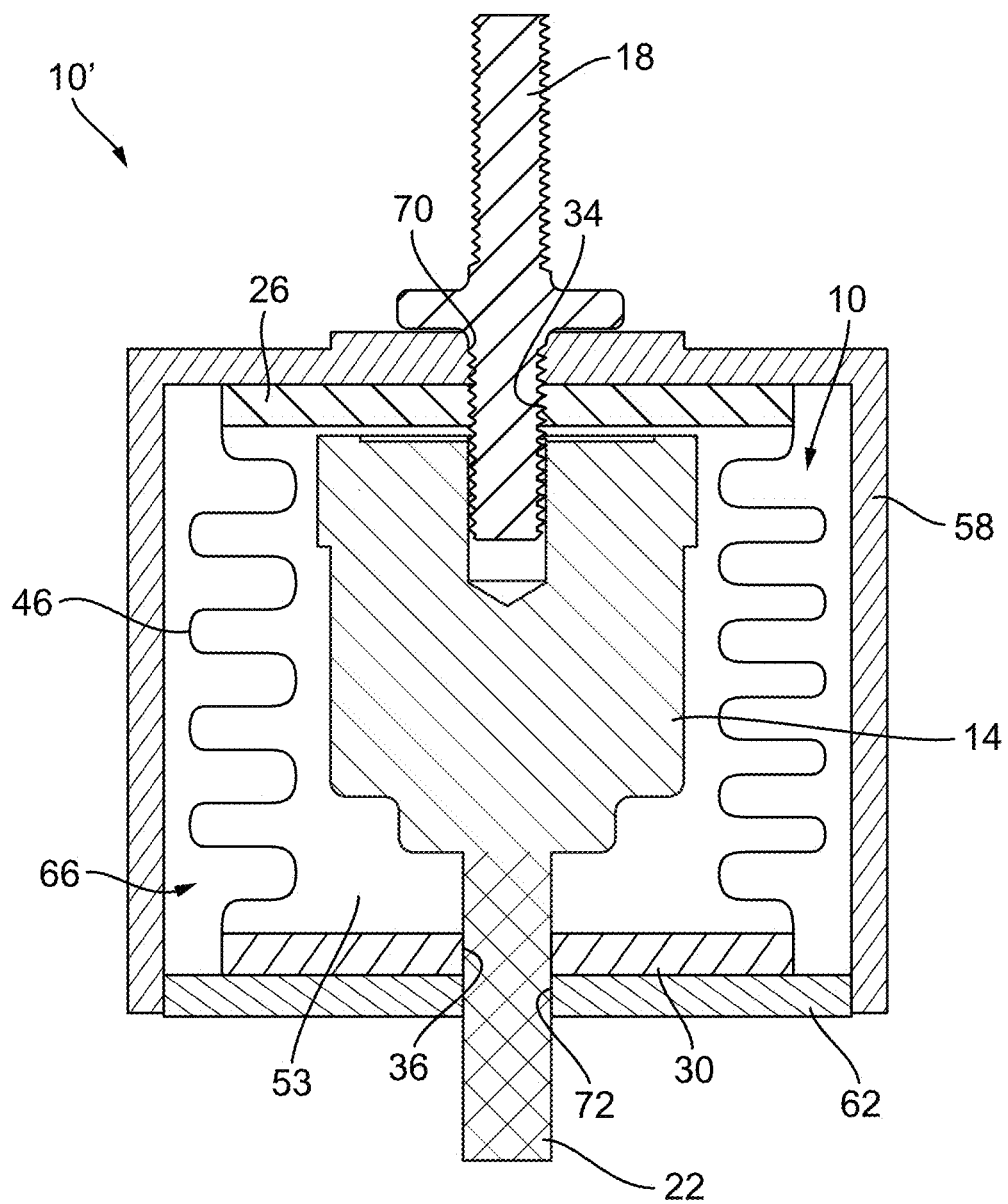
FIG. 6 is a cross-sectional view of the disconnector device and housing of FIG. 2 taken along the line 6-6 of FIG. 5.

As shown in FIGS. 5-6, the disconnector device 10 is positioned with a housing to form a disconnector assembly 10'. The housing is made up of a first housing member or cap 58 and a second housing member or bottom cover 62. The bottom cover 62 is removably coupled to the cap 58, and a cavity or chamber 66 is defined between the cap 58 and the cover 62. The chamber 66 is sized to receive the disconnector device 10 and the sleeve 46 when it is collapsed or un-extended. That is, the sleeve 46 is longer than the distance between the upper and lower sleeve connectors 26, 30 when both are positioned within the cavity 66. In the some embodiments, the bottom cover 62 is loosely coupled to the cap 58. In other words, the bottom cover 62 is not permanently fixed to the cap 58, but cannot move relative to the cap 58 without applying a substantial amount of force (e.g., more than the force of gravity). For example, in the illustrated embodiment, the cover 62 is coupled to cap 58 using a bolted connection. In other embodiments, the cap 58 and cover 62 may be coupled in a different manner. A gasket 65 (FIG. 2) is positioned between the cap 58 and the cover 62. The housing helps protect the disconnector device 10 from weather (e.g., rain, snow, etc.).

The cap 58 and the bottom cover 62 each include an opening 70, 72 (FIG. 6) that receive the respective stud 18, 22. The studs 18, 22 extend through the openings 70, 72, so that a length of each stud 18, 22 remains exposed. The studs 18, 22 may connect to an electrical device and ground (discussed in greater detail below) and provide electrical communication into and out of the chamber 66. The cap 58 and bottom cover 62 are each secured to the respective stud 18, 22 in order to limit relative movement between the cap 58, bottom cover 62, and respective stud 18, 22.

Figure 2:
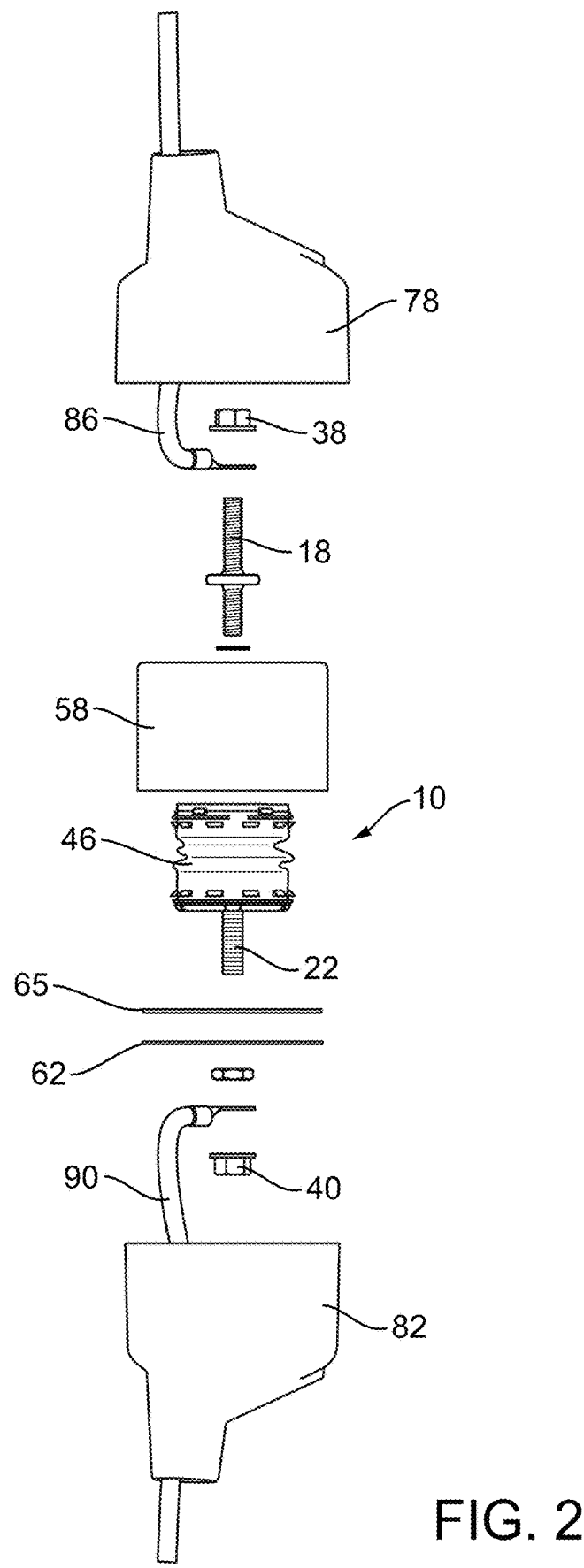
FIG. 2 is an exploded view of the disconnector assembly of FIG. 1, the disconnector assembly having a disconnector device and a housing.
Figure 3:
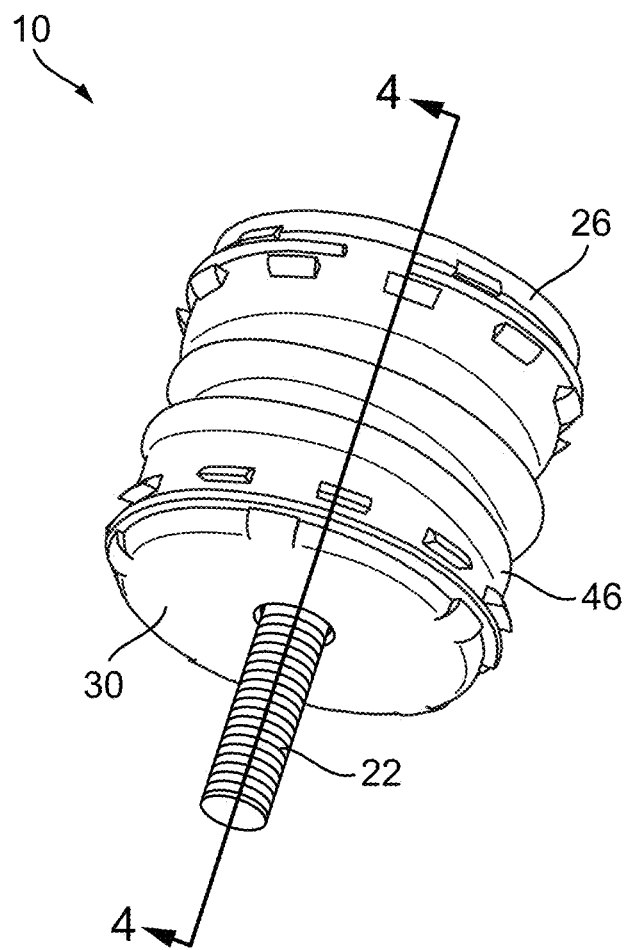
FIG. 3 is a perspective view of the disconnector device of FIG. 2.

In the embodiments of FIGS. 1-6, an auxiliary or outer housing encloses the disconnector assembly 10'. As shown in FIGS. 1-2, the outer housing includes a first or upper housing part 78 and a second or lower housing part 82 that enclose the disconnector assembly 10'. The first and second housing parts 78, 82 are removably coupled (e.g., by a push-on or friction fit connection or the like) to one another. In the illustrated embodiment, the top stud 18 is in electrical communication with an electrical wire 86 that extends through an opening (not shown) in the upper housing part 78. In the illustrated embodiment, the bottom stud 22 is in electrical communication with an electrical wire 90 that extends through an opening (not shown) in the lower housing part 82. The outer housing helps to prevent access by humans and wildlife to the electrical components housed within and protects the electrical components from being tampered with by humans and wildlife.

As shown in FIGS. 5-6, the disconnector assembly 10' includes a closed configuration in which the sleeve 46 is in a collapsed or un-extended position between the upper and lower sleeve connectors 26, 30. That is, when the disconnector device 10' is in the closed configuration, the bottom cover 62 is coupled to the cap 58, and the sleeve 46 is folded or collapsed such that it fits in the chamber 66 formed by the cap 58 and the bottom cover 62. Accordingly, as shown, the isolator 14, the upper and lower sleeve connectors 26, 30, and the sleeve 46 are positioned within the chamber 66.

During normal operation, the disconnector assembly 10' may electrically connect a first conductor and a second conductor. In one example, an energized conductor of an electrical device (e.g., an electrical grid line, a hot-line, a phase line, or the like) may be coupled to a high voltage terminal of a surge arrester, and the disconnector assembly 10' may be coupled between a ground terminal of a surge arrester and a conductor at ground potential, for example, system electrical ground. The disconnector assembly 10' and the surge arrester form an overvoltage protection assembly. One stud (e.g., the upper stud 18) via the wire 86 is connected to a ground terminal of the surge arrester, and the other stud (e.g., the lower stud 22) via the wire 90 is connected to the conductor at ground potential.

Although the disconnector assembly 10' is typically in a closed configuration, a condition may be met such that the disconnector assembly 10' performs an operating function. This condition may be, for example, reaching a temperature threshold, a leakage current, an overvoltage threshold, an overcurrent threshold, or the like. The operating function may be, for example, a movement such that the cap 58 and the cover 62 are separated. The operating function may also be an action that breaks or disables a component (e.g., the isolator 14) of the disconnector assembly 10'. For example, the charge of the isolator 14 may include a cartridge containing gunpowder. When high temperature, high voltage, or high current are sustained, the gunpowder within the cartridge is ignited, causing an explosion that forces the cap 58 and the cover 62 apart. Alternatively, the gunpowder may ignite based on a leakage current through the arrester exceeding a safe amount. Additionally, if the arrester is in thermal runaway, the explosion will also break the electrical connection. If the arrester has already failed, the explosion will not break the electrical connection.

Figure 7:
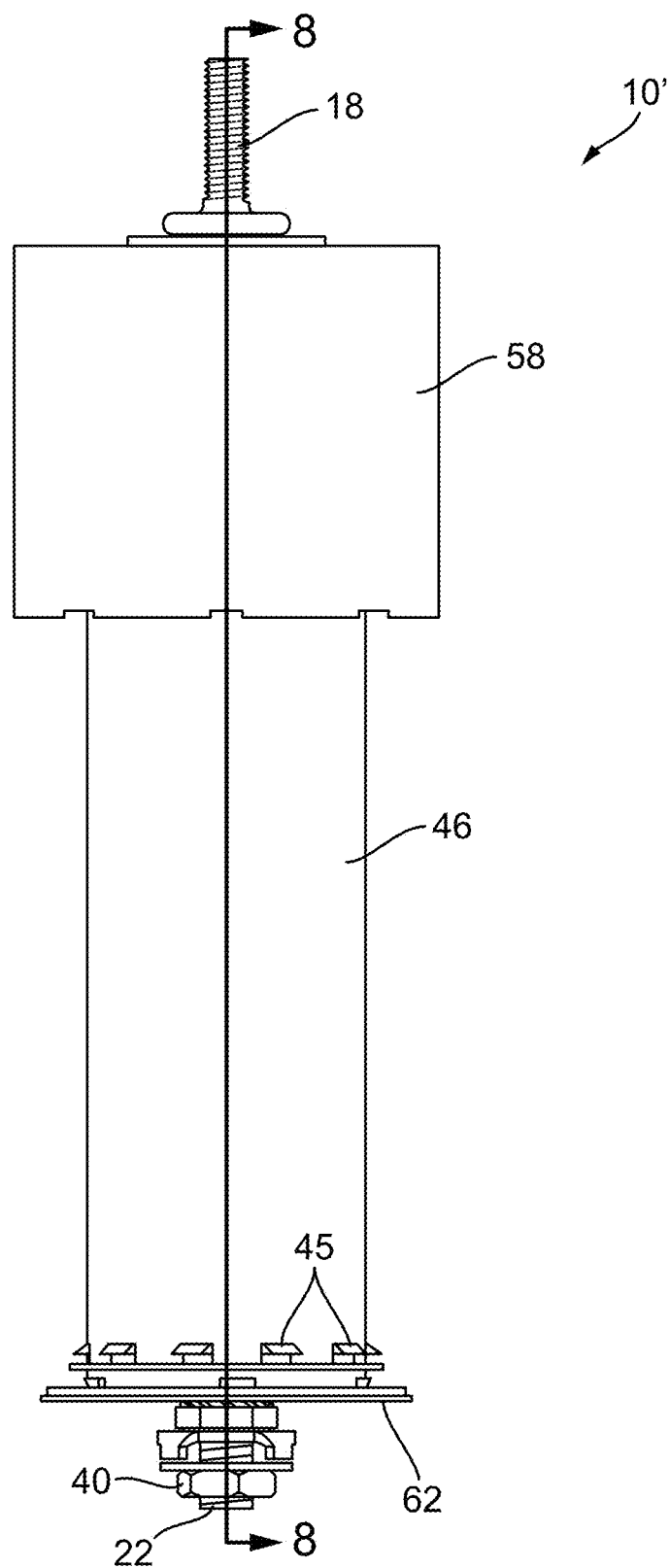
FIG. 7 is a side view of the disconnector device and housing of FIG. 2 in an extended position.
Figure 8:
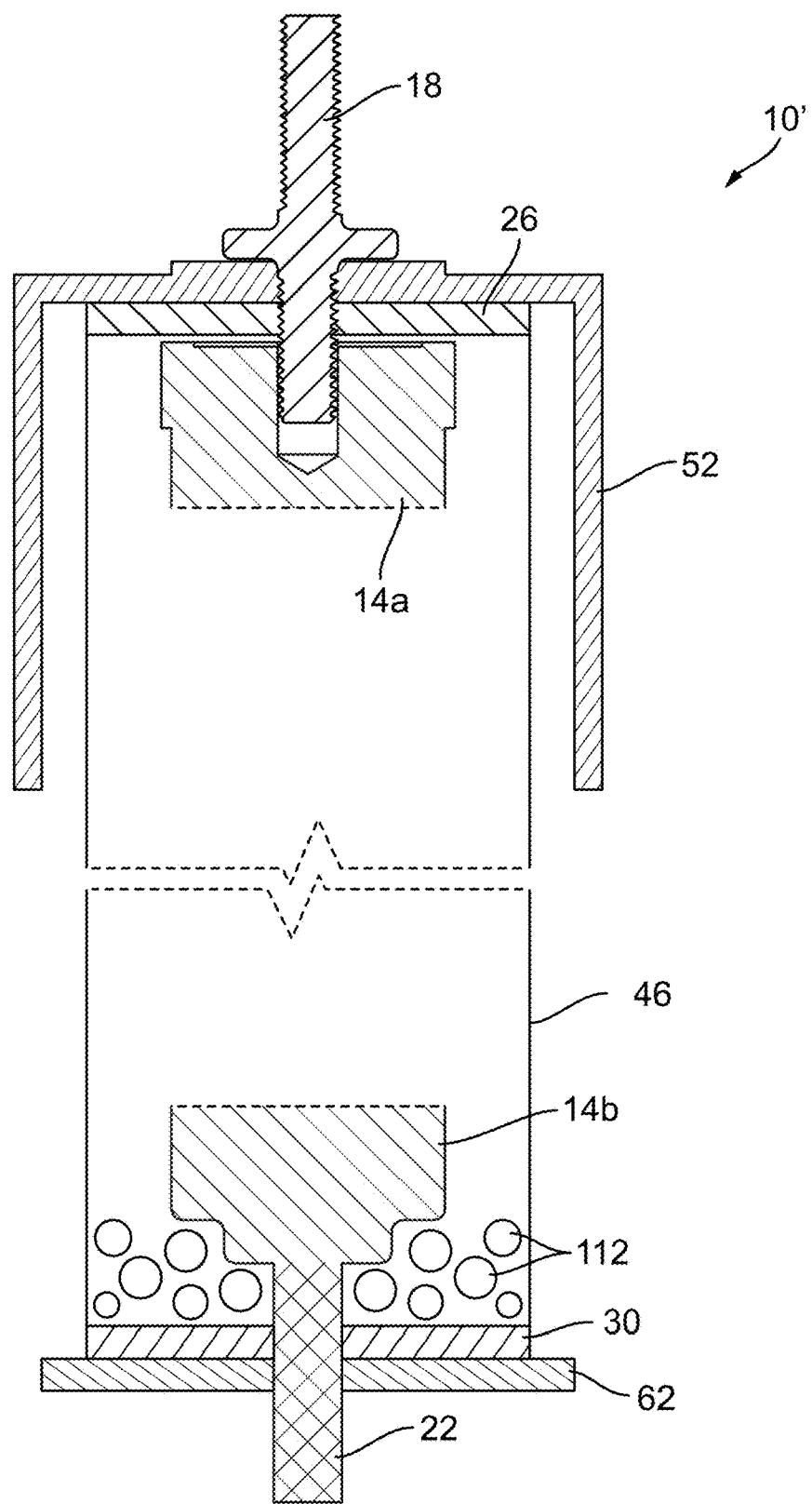
FIG. 8 is a cross-sectional view of the disconnector device and housing of FIG. 2 taken along the line 8-8 of FIG. 7.

One embodiment of operation of the disconnector assembly 10' may be as follows. When the electrical device experiences a fault condition (e.g., a leakage current, an overcurrent, an over voltage, etc.), current from the electrical device flows through the disconnector assembly 10', and specifically, the disconnector device 10, towards ground. While current flows through the disconnector device 10, the disconnector device 10 begins to heat up. That is, excess heat will build up in the disconnector assembly 10', and specifically within the isolator 14. Once a temperature threshold has been reached, the disconnector device 10 operates such that current flow from the electrical device to the ground is interrupted. That is, as shown in FIGS. 7 and 8, this excess heat will eventually cause the charge to detonate, and the fault condition will be isolated from the rest of the system. Accordingly, the isolator 14 may operate at or prior to failure of the surge arrester. In addition to the described disconnector assembly 10', the operating function to disrupt current flow could be performed by a fuse, a switch, or the like.

Further with reference to FIGS. 7 and 8, when the isolator 14 operates or detonates it breaks apart or fractures into a first section or top insulator 14a and a second section or bottom insulator 14b. Moreover, the detonation also causes the housing to break, destruct, fragment, melt or extend to facilitate movement of the sleeve 46 from the un-extended position to the extended position. That is, the detonation causes the cover 62 to separate from the cap 58. Gravity and the force of the explosion causes the cover 62 and bottom insulator 14b move away from the cap 58, which extends the sleeve 46 and may break the electrical contact between the upper and lower studs 18, 22. As discussed in greater detail below, potentially hot particles 112 may be contained inside extended sleeve 246.

FIGS. 7 and 8 also illustrate the disconnector device 10 in an operated configuration (after the charge has detonated). The lower sleeve connector 30, cover 62 and the bottom stud 22 have moved in a direction substantially parallel to the top stud 18 and perpendicular to upper sleeve connector 26. In the operated configuration, the cap 58 and the cover 62 are not coupled and in fact are spaced apart from one another. Thus, in the operated position, the top sleeve connector 26 and the bottom sleeve connector 30 are separate such that the sleeve 46 has been extended. Also, the top isolator 14a remains connected to the top stud 18 and the top sleeve connector 26 and the bottom isolator 14b remains connected to the bottom stud 22 and the bottom sleeve connector 30.

When the disconnector assembly 10' is in the operated configuration, this electrical connection is broken. In other words, if not already broken, the detonation of the charge may break electrical contact between the energized contact of the electrical device and ground. While the studs 18, 22 remain electrically connected to the energized conductor of the electrical device and the ground, respectively, the fracturing of the isolator 14 into top and bottom isolators 14a, 14b and the separation of the bottom cover 62 from the cap 58 creates an open circuit. As shown in FIG. 8 and noted above, each top and bottom isolators 14a, 14b remains connected to its respective stud 18, 22, but the top and bottom isolators 14a, 14b are not in contact and no current may pass between them. The open circuit prevents the system from faulting to ground after being energized without being removed.

Electrical arcing occurs when the electrical contact is broken between the energized contact of the electrical device and ground. In order to prevent or limit electrical arcing, circuit breakers (not shown) may be placed within the system to stop the flow of power to the upper stud 18. Once the flow of power stops, an arc cannot longer be sustained between the top and bottom isolators 14a, 14b. The distance between the fractured housings 14a, 14b is then too great for another arc to form. In some embodiments, the isolator 14 may also have (e.g., be made with, be coated with, etc.) an arc quenching material, which may suppress the arc produced as a result of the broken electrical contact. Suppressing the arc results in fewer hot or burning particles 112 as a result of the explosion. In the illustrated embodiment, alumina trihydrate (ATH) may be used as the arc quenching material, although different materials may also be used.

Particles 112 are created as a result of both the explosion and subsequent fracturing of the charge housing, as well as the electrical arcing that may occur. These particles 112 are often hot or burning. As noted above, the sleeve 46 is heat resistant so that the explosion and the particles 112 do not destroy the sleeve 46. For example, the sleeve 46 may be resistant to at least 500° C. In other embodiments, the sleeve 46 may be resistant to at least 600° C. In some embodiments, the sleeve 46 captures all of these particles 112 in order to prevent or substantially limit the number of particles 112 that fall to the ground. By containing the particles 112 within the sleeve 46, fires may be prevented.

If the operation takes place due to the requirement of leakage current being met, the distance between 14a and 14b will be sufficient to break electrical contact without the use of breakers, fuses or other external equipment, and there for maintaining an energized state on the system.

The disconnection of the upper and lower housing parts 78, 82 may provide a visual indication of a fault condition having occurred. The sleeve 46 may also provide a visual indication of a fault condition having occurred. The extended position of the sleeve 46 may make it easier for an operator to identify where the fault occurred, so that it can be repaired. Additionally, the sleeve 46 may be made from a bright color (e.g., yellow, red, orange, or the like) that is visible for a long distance away, in order to further assist the operator in identifying where the fault occurred. The operator may then replace the disconnector assembly 10' such that the overall system does not continue to operate with a failed component.

Figure 9:
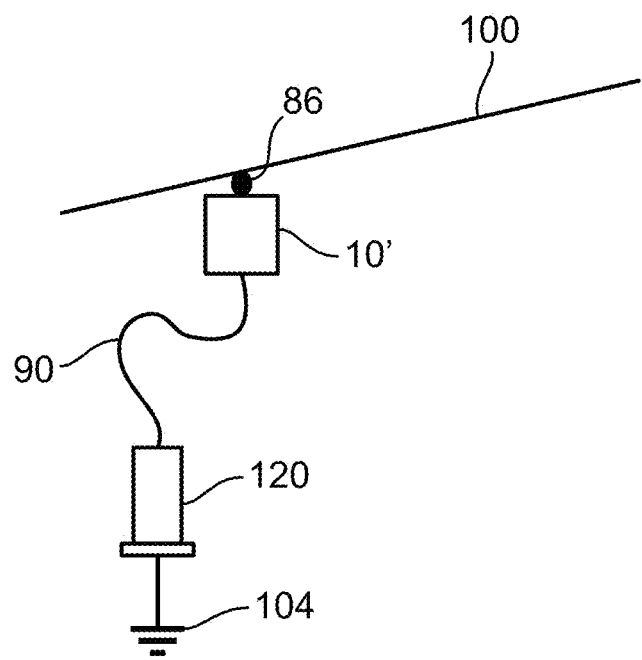
FIG. 9 is a schematic view of the disconnector assembly positioned between an electrical device and a surge arrester.

In another embodiment, as shown in FIG. 9, during normal operation, the disconnector assembly 10' may electrically connect to an energized conductor of an electrical device 100 and the high voltage terminal of a surge arrester surge arrester 120. The disconnector assembly 10', the electrical device 100, and the surge arrester 120 form the overvoltage protection assembly in FIG. 9. One stud (e.g., the upper stud 18) is connected to the energized conductor of the electrical device 100, and the other stud (e.g., the lower stud 22) is connected to the high voltage terminal of the surge arrester 120. The ground terminal of the surge arrester 120 is coupled to an electrical ground 104. In the embodiment illustrated in FIG. 9, the lower stud 22 is coupled to the surge arrester 120 by the wire 90. In other words, the lower stud 22 is coupled to the surge arrester 120 indirectly. The surge arrester 120 may be any known type of surge arrester.

One embodiment of operation of the disconnector assembly 10' may be as follows. The surge arrester 120 enters a conductive state once a predetermined current threshold is exceeded due to an overvoltage fault. Current from the electrical device 100 flows through the disconnector assembly 10' and the surge arrester 120 towards ground 104. While current flows through the disconnector assembly 10', the disconnector assembly 10', and in particular the disconnector device 10, begins to heat up. Once a temperature threshold has been reached, the disconnector device 10 operates such that current flow from the electrical device 100 to the surge arrester 120 and the ground 104 is interrupted. Accordingly, the isolator 14 may operate at or prior to failure of the surge arrester 120. As discussed above, when the disconnector assembly 10' performs the operating function, the disconnector assembly 10' moves from the closed configuration to the operated configuration. In addition to the described disconnector assembly 10', the operating function to disrupt current flow could be performed by a fuse, a switch, or the like. In the illustrated embodiment, either the disconnector assembly 10' or the surge arrest 120 or both may then be replaced and the fault rectified.

Figure 10:
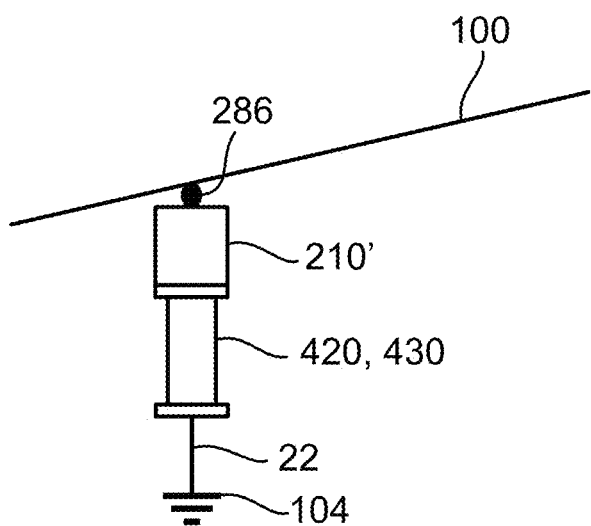
FIG. 10 is a schematic view of a disconnector assembly according to another embodiment positioned between an electrical device and surge arrester.
Figure 11:
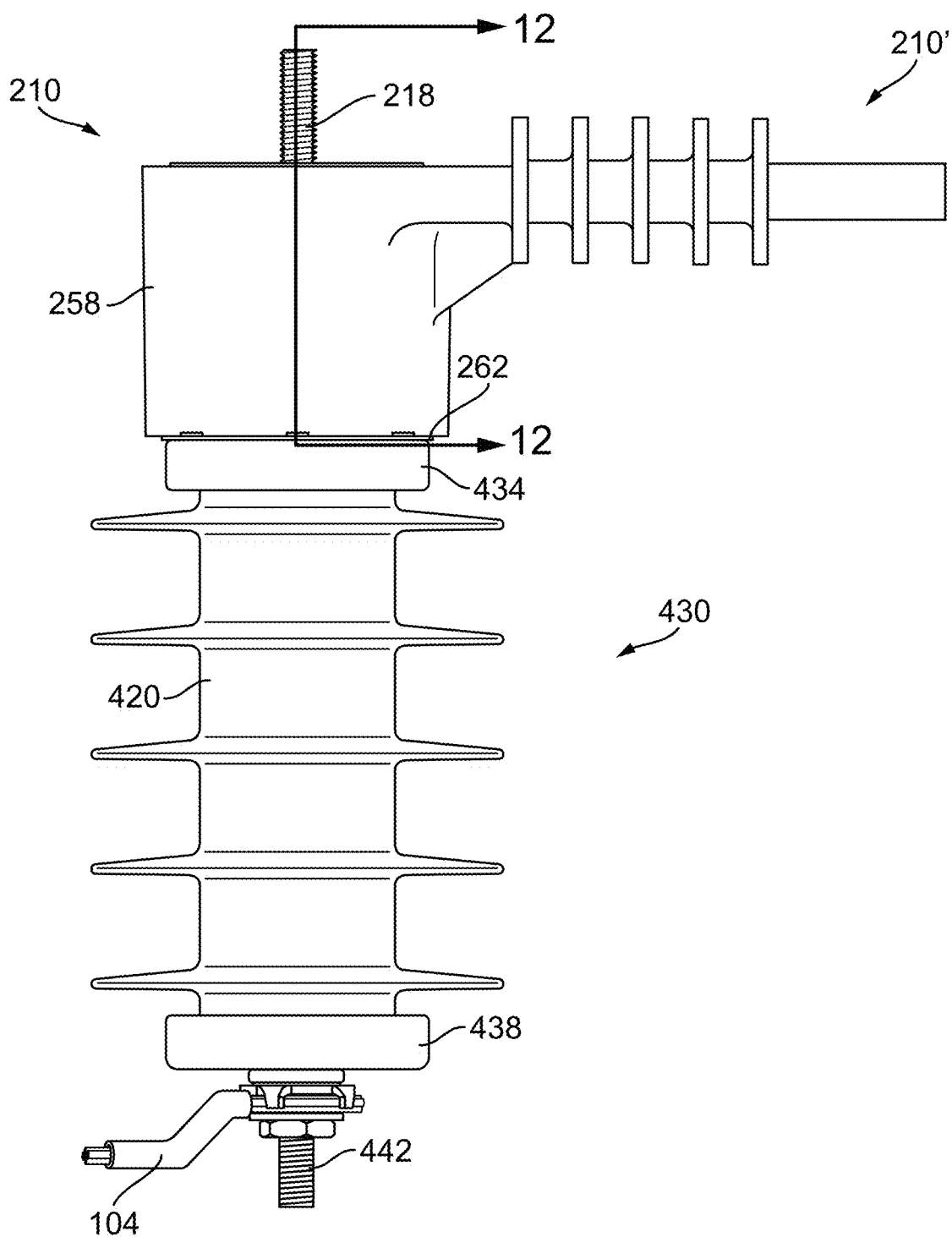
FIG. 11 is a side view of a disconnector device and surge arrester FIG. 10 in an un-extended position.
Figure 12:
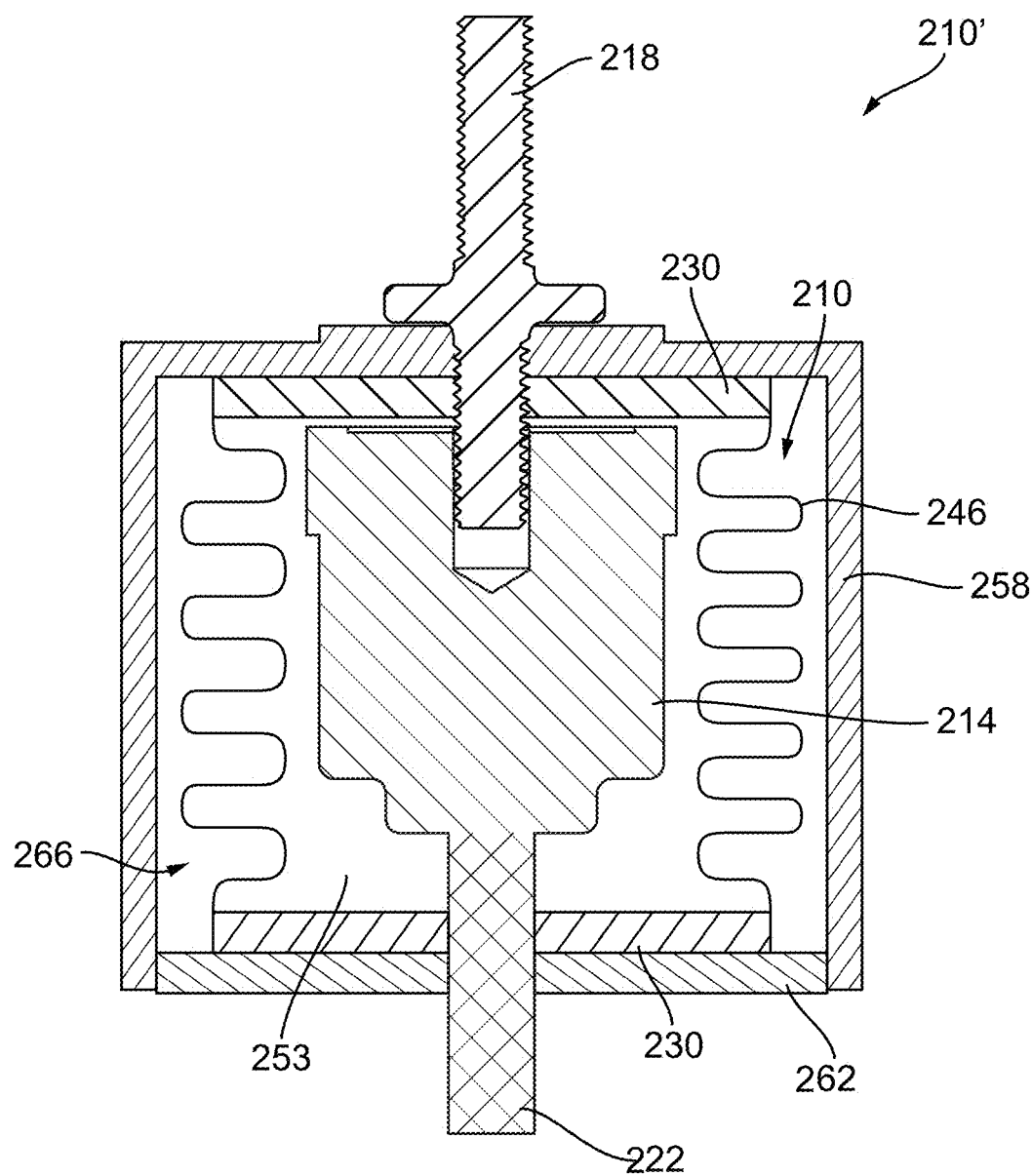
FIG. 12 is a cross-sectional view of the disconnector device of FIG. 11 taken along the line 13-13 of FIG. 12.

FIGS. 10-14 show a disconnector assembly 210' according to another embodiment. As shown in FIGS. 10 and 11, the disconnector assembly 210' may be directly coupled to the surge arrester 420. The disconnector assembly 210' and the surge arrester 420 form the overvoltage protection assembly in FIG. 10. The disconnector assembly 210 of FIGS. 10-14 is similar to the disconnector assembly 210' of FIGS. 1-8. Therefore like structure will have like reference numerals plus "200".

The disconnector assembly 210' includes a disconnector device 210 and a surge arrester assembly 430 that is directly and removably coupled to and extends from the disconnector device 210. Like the embodiments of FIGS. 1-8, the disconnector device 210 includes a first housing member or cap 258. The second housing part or cover 262 of the embodiments of FIGS. 1-8, is incorporated into the surge assembly 430 of in FIGS. 10-14. The surge arrester assembly 430 includes the surge arrester 420 positioned between the first or top plate 434 and a second or bottom plate 438. The top plate 434 is coupled to the cover 262. The surge arrester 420 may be any known type of surge arrester. The disconnector device 210 is configured to electrically connect the electrical device 100 to the surge arrester 420, which is electrically connected to ground 104. In particular, and similar to FIGS. 1-8, the disconnector device 210 can be coupled to the electrical device 100 by a first or top stud 218 (e.g., a first terminal) that extends from the cap 258. The surge arrester 420 can be coupled to ground 104 via a third terminal 442 (e.g., the ground terminal), which extends from the bottom plate 438 of the surge arrester assembly 430.

Figure 13:
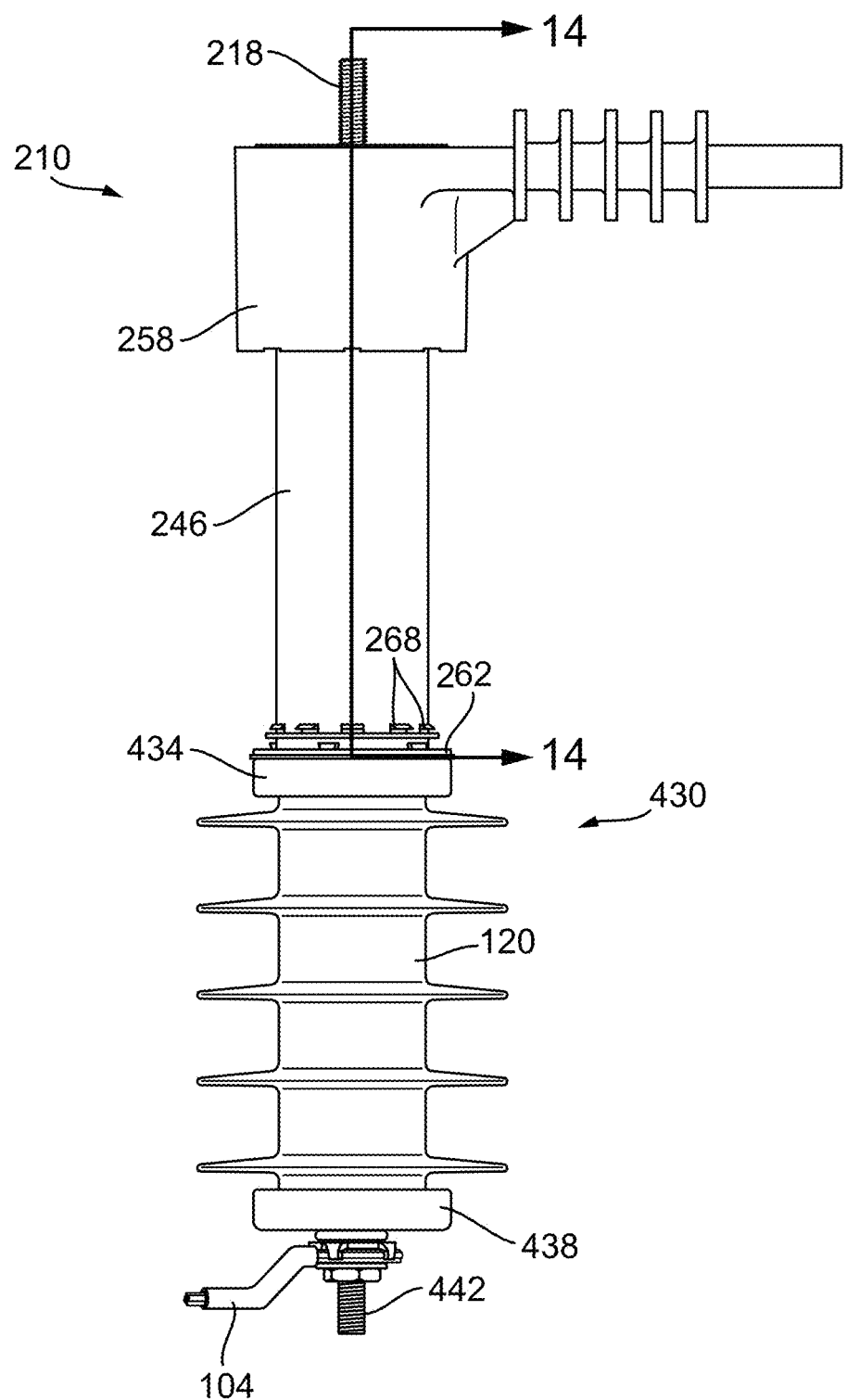
FIG. 13 is a side view of the disconnector device of FIG. 10 in an extended position.
Figure 14:
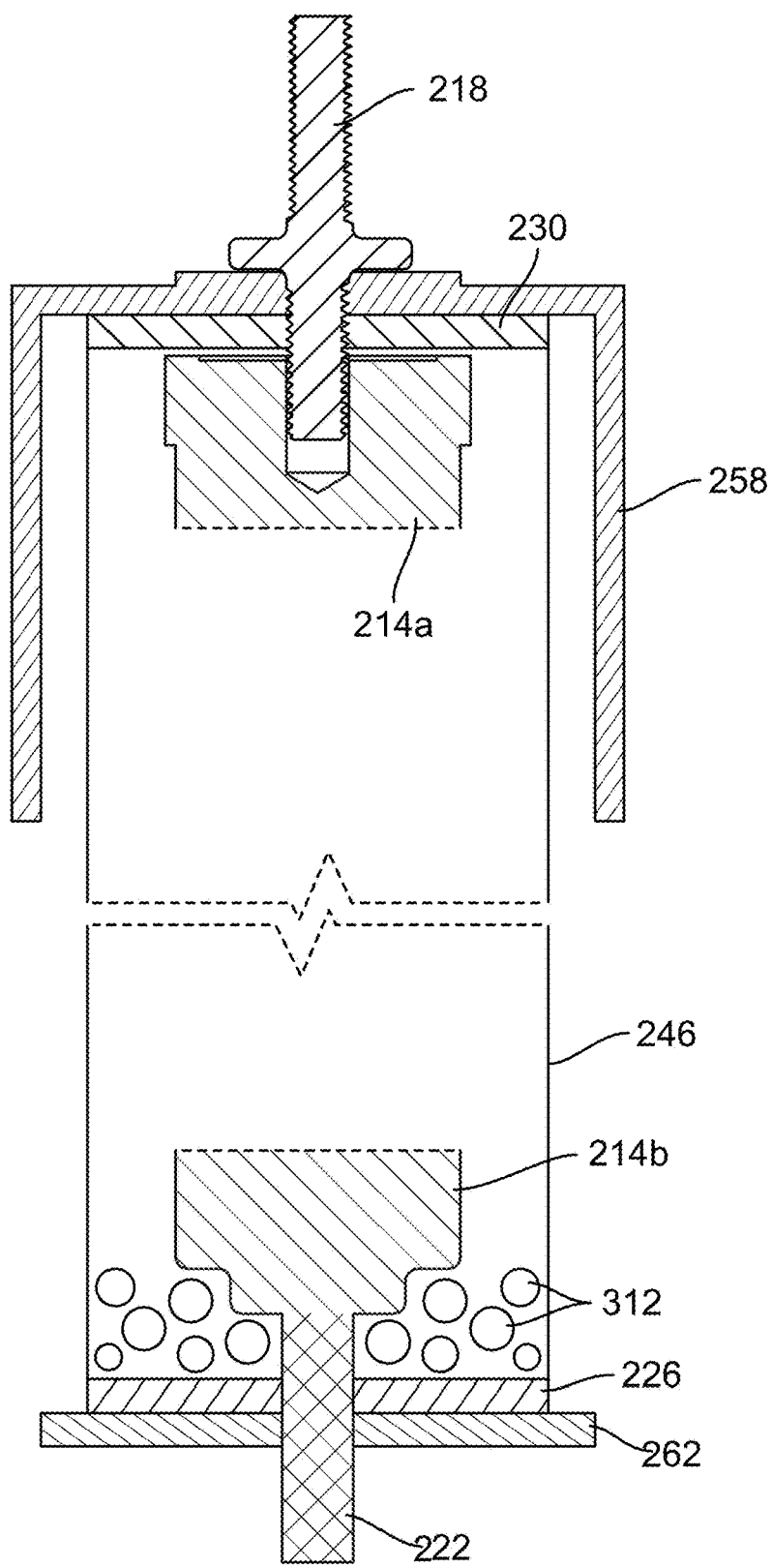
FIG. 14 is a cross-sectional view of the disconnector device of FIG. 10 taken along the line 14-14 of FIG. 13.

The disconnector assembly 210' is movable between a first, closed, configuration (FIGS. 11-12) and a second, operated, configuration (FIGS. 13-14). In the closed configuration, the surge arrester assembly 430 is coupled to the disconnector device 210. More specifically, in the closed configuration the cover 262 of the surge arrester assembly 430 is coupled to and abuts the cap 258, and the surge arrester 420 is positioned relative to the cap 258 by a first distance. In the illustrated embodiment, the first distance is approximately equal to the height of the cover 262 but the first height can be greater or smaller in other embodiments. Like the cover 262 of FIGS. 1-8, the cover 262 has a locking mechanism (e.g., bolted connection) that couples the cover 262 to an interior surface of the cap 258. In the operated position, the cover 262 and the surge arrester assembly 430 is spaced apart from the disconnector device 210. In particular, the cover 262, therefore, the surge arrester 420, is spaced apart from the cap 258. That is, the surge arrester 420 is spaced apart from the cap 258 by a second distance that is greater than the first distance.

Figure 4:
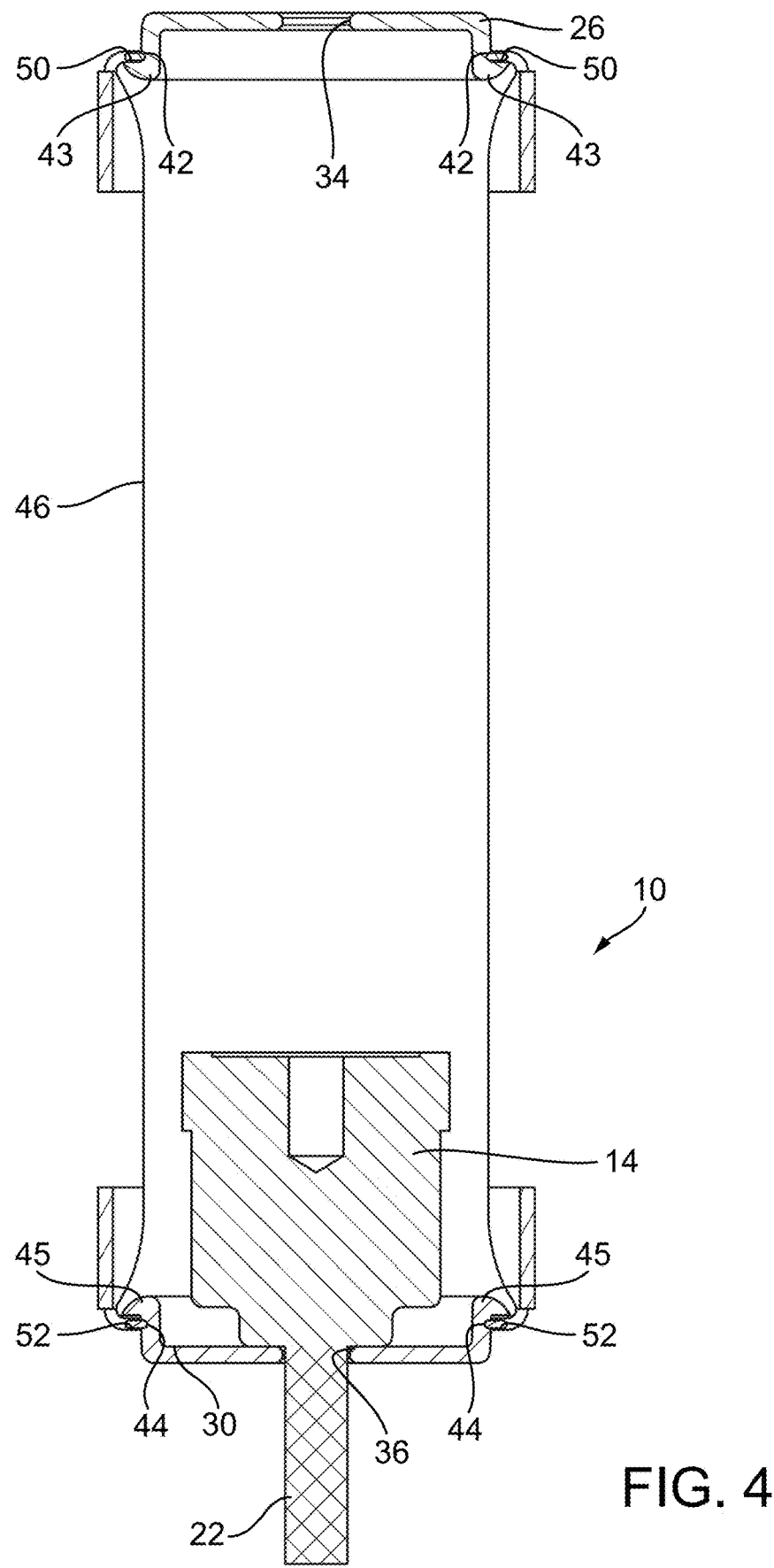
FIG. 4 is a cross-sectional view of the disconnector device of FIG. 3 taken along the line 4-4.

In the closed configuration, the disconnector device 210 and the surge arrester assembly 430 enclose several components. In particular, and like the embodiments of FIGS. 1-8, in the closed configuration the cap 258 and the cover 262 encase the isolator 214, the sleeve 246, the upper sleeve connector 226, and the lower sleeve connector 230 encased within the cap 258. The isolator 214 may be further enclosed by an arc quenching material, as discussed above with respect to FIGS. 1-8. The upper sleeve connector 226 and the lower sleeve connector 230 are coupled to one another via the sleeve 246 in the closed configuration. When the disconnector device 210 is in the closed configuration, the sleeve 246 is folded or collapsed (e.g., un-extended) such that it fits in a chamber 266 formed by the isolator 214 and the cap 258. As shown in FIGS. 2 and 4, the top stud 218 extends from the upper sleeve connector 226 through the cap 258 thereby projecting from the cap 258. The second terminal 222 extends through the cover 262 to electrically and physically couple or affix the lower sleeve connector 230 to the high-voltage terminal of the surge arrester 420.

Although the disconnector assembly 210' is typically in a closed configuration, a condition may be met such that the disconnector assembly 210' performs an operating function. This condition may be, for example, reaching a temperature threshold, a leakage current threshold, an overvoltage threshold, an overcurrent threshold, or the like. The operating movement may move the surge arrester assembly 430 from the closed configuration to the operated configuration. That is, the operating function may be, for example, a movement such that the cap 258 and the cover 62 are physically separated, thereby physically distancing the surge arrester assembly 430 from the disconnector device 210. The operating function may also be an action that breaks or disables one or more components of the disconnector device 210. For example, like the isolator 14 of FIGS. 1-8, the isolator 214 may include a cartridge containing an explosive. When leakage current exceeds a predetermined threshold, the explosive within the cartridge is ignited, causing an explosion that forces the cap 258 and the cover 262 apart, breaking the electrical connection.

One embodiment of operation of the disconnector assembly 210' may be as follows. The surge arrester 420 enters a conductive state once a predetermined current threshold is exceeded due to an overvoltage fault. Current from the electrical device 100 flows through the disconnector assembly 210' towards ground 104. That is, current from the electrical device 100 flows through the cap 258 of the disconnector device 210 and the surge arrester 420 towards ground 104. While current flows through the disconnector assembly 210', the disconnector device 210 begins to heat up. Once a temperature threshold has been reached, the disconnector device 210 operates such that current flow from the electrical device 100 to the surge arrester 420 and the ground 104 is interrupted. Accordingly, the isolator 214 may operate at or prior to failure of the surge arrester 420. In addition to the described disconnector device 210, the operating function to disrupt current flow could be performed by a fuse, a switch, or the like.

In accordance with at least one embodiment, when the disconnector device 210 operates it enters the operated configuration, shown in FIGS. 13 and 14. When the disconnector device 210 is in the operated configuration, the electrical connection is broken. As shown, the entire surge arrester assembly 430, with the cover 262, has moved in a direction substantially parallel to and away from the top stud 218 and perpendicular to the upper sleeve connector 226. That is, in the operated configuration, the entire surge arrester assembly 430 is spaced apart from the disconnector device 210. More specifically, in the operated configuration, the top plate 434 is spaced apart from the cap 258 of the disconnector device 210. Also, the top sleeve connector 226 and the bottom sleeve connector 230 have been separated such that the fire resistant sleeve 246 has been extended. The isolator 214 has been broken such that there is a top isolator 214a connected to the top sleeve connector 226 and a bottom isolator 214b connected to the bottom sleeve connector 230. In some embodiments, breaking the isolator 214 may result in debris caught in the chamber formed between the bottom isolator 214b and the fire resistant sleeve 246, as discussed above. Also, in some embodiments, as discussed above, the physical distance created between of the top and bottom isolators 214a, 214b and the arc quenching material 252 prevent electrical arcs from forming.

As discussed above with respect to FIGS. 1-8, if the operation takes place due to the requirement of leakage current being met, the distance between 214a and 214b will be sufficient to break electrical contact without the use of breakers, fuses or other external equipment, and there for maintaining an energized state on the system.

Although aspects have been described in detail with reference to certain preferred embodiments, variations and modifications exist within the scope of one or more independent aspects as described. Various features and advantages of the present application are set forth in the following claims.

What is claimed is:

1. A disconnector device comprising:
   an isolator connecting a first terminal and a second terminal;
   a sleeve positioned around the isolator and including a first end and a second end, the sleeve moveable between an un-extended position prior to the isolator operating and an extended position after the isolator operates, the sleeve being configured to trap debris produced by operation of the isolator; and
   a housing having a first portion and a second portion, the housing configured to contain the isolator and the sleeve in the un-extended position and separate during isolator operation,
   wherein the first end of the sleeve is coupled to the first portion of the housing and the second end of the sleeve coupled to the second portion of the housing in both the un-extended position and extended position.

2. The disconnector device of claim 1, wherein the sleeve is made from a fire-resistant material.

3. The disconnector device of claim 1, wherein one or more of the housing and the sleeve further includes an arc-quenching material.

4. The disconnector device of claim 1, wherein when the isolator operates, the housing destructs or extends and the sleeve moves from the un-extended position to the extended position.

5. The disconnector device of claim 1, wherein an electrical connection between the first terminal and the second terminal breaks when the isolator operates.

6. The disconnector device of claim 1, further comprising a visual indicator that indicates an operated condition of the disconnector device.

7. The disconnector device of claim 1, wherein the isolator provides an electrical connection between a first conductor and a second conductor, and the isolator performs an operating function to interrupt the electrical connection.

8. The disconnector device of claim 7, wherein the first conductor is an energized conductor and the second conductor is a high voltage terminal of a surge arrester.

9. The disconnector device of claim 8, wherein the isolator operates prior to failure of the surge arrester.

10. The disconnector device of claim 9, wherein the first terminal or second terminal is mechanically coupled to the high voltage terminal of the surge arrester.

11. The disconnector device of claim 7, wherein the first conductor is a ground terminal of a surge arrester and the second conductor is connected to electrical ground.

12. The disconnector device of claim 11, wherein the isolator operates prior to failure of the surge arrester.

13. The disconnector device of claim 7, wherein the operating function of the isolator includes physically separating the first terminal and the second terminal.

14. The disconnector device of claim 7, wherein the operating function is based on thermal overload.

15. The disconnector device of claim 7, wherein the operating function is based on a leakage current.

16. The disconnector device of claim 7, wherein the operating function is based on an overvoltage condition.

17. An electrical system comprising:
   an electrical conductor for carrying an electrical current;
   a surge device configured to conduct at least some of the electrical current based on the occurrence of a first predetermined condition;
   an isolator configured to conduct at least some of the electrical current, wherein the isolator includes a destructive component that destructs when a second predetermined condition is satisfied, and
   wherein the isolator includes a cover formed from a material that is compressible and expandable and that is configured for retaining at least some of the destructive component of the isolator when the destructive component destructs.

18. The electrical system of claim 17, wherein the isolator includes a first electrical connector coupled to the electrical conductor and a second electrical connector coupled to the surge device.

19. The electrical system of claim 17, wherein the destructive component is positioned entirely within the flexible cover.

20. The electrical system of claim 17, further comprising a housing containing the isolator, the flexible cover including a first end coupled to the housing and a second, opposite end coupled to the housing.

21. The electrical system of claim 17, further comprising a housing containing the isolator, wherein the flexible cover is formed of a different material than the housing.

* * * * *